United States Patent
Löwenadler et al.

(10) Patent No.: US 9,204,280 B2
(45) Date of Patent: Dec. 1, 2015

(54) METHOD AND APPARATUS FOR CHARGING PRODUCT-RELATED SERVICES IN A COMMUNICATION NETWORK

(71) Applicant: Telefonaktiebolaget L M Ericsson (publ), Stockholm (SE)

(72) Inventors: Peter Löwenadler, Karlskrona (SE); Björn Ringberg, Rödeby (SE); Peter Skarphagen, Lyckeby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 82 days.

(21) Appl. No.: 14/033,916

(22) Filed: Sep. 23, 2013

(65) Prior Publication Data

US 2015/0087260 A1   Mar. 26, 2015

(51) Int. Cl.
*H04M 11/00* (2006.01)
*H04W 4/26* (2009.01)
*H04W 4/24* (2009.01)

(52) U.S. Cl.
CPC .. *H04W 4/26* (2013.01); *H04W 4/24* (2013.01)

(58) Field of Classification Search
CPC ........ H04W 4/24; H04W 88/02; H04M 15/00
USPC ........................... 455/405–409, 422.1, 432.2; 379/111–114.1, 0.2–0.29
See application file for complete search history.

(56) References Cited

U.S. PATENT DOCUMENTS

| | | | |
|---|---|---|---|
| 6,493,547 B1 * | 12/2002 | Raith | 455/405 |
| 7,450,928 B1 * | 11/2008 | Henry et al. | 455/408 |
| 7,668,765 B2 * | 2/2010 | Tanaka et al. | 705/34 |
| 8,249,552 B1 * | 8/2012 | Gailloux et al. | 455/406 |
| 8,290,471 B1 | 10/2012 | Jones et al. | |
| 2012/0198046 A1 * | 8/2012 | Shah et al. | 709/224 |

FOREIGN PATENT DOCUMENTS

EP    1804478 A1    7/2007
WO    2010088298 A1    8/2010

OTHER PUBLICATIONS

3GPP, "3rd Generation Partnership Project; Technical Specification Group Services and System Aspects; Telecommunication management; Charging management; Diameter charging applications (Release 12)", 3GPP TS 32.299 V12.2.0, Sep. 2013, 1-156.

* cited by examiner

*Primary Examiner* — Steve D Agosta
(74) *Attorney, Agent, or Firm* — Murphy, Bilak & Homiller, PLLC

(57) ABSTRACT

According to one aspect of the teachings herein, a method and apparatus provide for dynamic, service-triggered provisioning of products, for use in authorizing product-related services to subscribers in a communication network. This approach obviates the need to pre-provision products to cover the possible usage of such services by eligible subscribers, which in turn means that the subscriber database memory requirements are reduced to the extent that the database does not need to hold potentially large numbers of pre-provisioned products. In an example embodiment, the number of products needed to cover an initial usage quota is speculatively generated responsive to a charging trigger and service to the involved subscriber is authorized using those speculatively generated products. Unused products are deleted and new products are generated as needed, to cover continued or subsequent usage of the service by the subscriber.

16 Claims, 14 Drawing Sheets ized products. In an example embodiment, the method includes speculatively generating the number of products needed to cover an initial usage quota, in response to a charging trigger. Service to the involved subscriber is authorized using those speculatively generated products. Unused products are deleted and new products are generated as needed, to cover continued or subsequent usage of the service by the subscriber.

METHOD AND APPARATUS FOR CHARGING PRODUCT-RELATED SERVICES IN A COMMUNICATION NETWORK

TECHNICAL FIELD

The present invention generally relates to communication networks and particularly relates to the provisioning of products for charging usage of product-related services in such networks.

BACKGROUND

Certain communication services may be offered to the subscribers of a given communication network according to "product offerings." For example, mobile broadband connectivity may be offered to individual subscribers of a cellular or other wireless or wired communication network in defined blocks of time, e.g., hourly. Additionally, or alternatively, the product offering may be based on discrete blocks of data transfer amounts.

In a known approach, such products are pre-provisioned in a subscriber database responsive to subscriber input, e.g., pre-purchases through a web portal, or they are pre-provisioned based on scheduled or automatic processing running within the communication network. Because usage of a product-related service is authorized for a given subscriber based on there being related products already provisioned for that subscriber, the network operator is obliged to pre-provision and store potentially large numbers of products in its subscriber database.

For example, for a mobile broadband service having a product offering in which connectivity is provided in one-hour increments, the network operator might, for each subscriber that is eligible for the service, provision twenty-four products to cover the next twenty-four hour usage period. Each such product corresponds to a specific one of the hours and is tied to a corresponding one of the eligible subscribers. Similarly, the network operator may make a product offering in which subscribers are allowed 1 GB of data transfer per month, where usage is assessed in 25 MB increments. For each such subscriber, the network operator would, in an example approach to pre-provisioning, provision forty 25 MB products at a minimum, to cover the monthly product offering. In this context, a 25 MB product will be understood as a record that covers or authorizes up to 25 MB in data transfer by a given subscriber.

With this approach, all the subscribers that have signed up for a given offer have to have their corresponding products available for authorizing actual service usage and all such products must be stored in advance in the subscriber database. Product storage quickly becomes burdensome. In the 24-hour and/or monthly data transfer product offering described above, the network operator would generate from twenty-four to forty products per subscriber, depending on which product offering the subscriber selected. Example numbers of 600,000 subscribers and fifty bytes of storage required per product imply storage requirements of 720 MB to 1.2 GB for the pre-provisioned products. That amount of data is prohibitive, particularly because of the way subscriber databases are used in real-time within the network charging systems.

SUMMARY

According to one aspect of the teachings herein, a method and apparatus provide for dynamic, service-triggered provisioning of products, for use in authorizing product-related services to subscribers in a communication network. This approach obviates the need to pre-provision products to cover the possible usage of such services by eligible subscribers, which in turn means that the subscriber database memory requirements are reduced to the extent that the database does not need to hold potentially large numbers of pre-provisioned products. In an example embodiment, the method includes speculatively generating the number of products needed to cover an initial usage quota, in response to a charging trigger. Service to the involved subscriber is authorized using those speculatively generated products. Unused products are deleted and new products are generated as needed, to cover continued or subsequent usage of the service by the subscriber.

In an example embodiment, a charging node comprising or included in the charging system of a communication network is configured to perform a method of product provisioning for charging usage of a product-related service to a subscriber in a communication network. The method includes receiving a charging trigger arising from a service activity by the subscriber, and authorizing use of the service by the subscriber with respect to one or more products. This authorization-related processing includes dynamically generating the one or more products initially, according to a defined set of product provisioning rules, or determining that the one or more products are available from a prior generation. Each given product covers a defined amount of service usage, and this initial processing in one or more embodiments involves generating as many products as are needed to cover an initial usage quota associated with authorizing the service.

The method further includes assessing any actual usage of the service by the subscriber against the one or more products, up to the defined amount of service usage covered by the one or more products, and dynamically generating additional products as needed, to cover continued actual use of the service by the subscriber. Here, dynamic generation includes prospectively generating each next additional product before reaching a coverage limit of a current additional product against which the continued actual usage is being assessed. Additionally, the method includes saving used ones of the products into a subscriber database, to record the actual usage of the service by the subscriber. In at least some embodiments, any of the speculatively generated products that go unused are deleted, at least after expiry of any life cycle associated with them.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
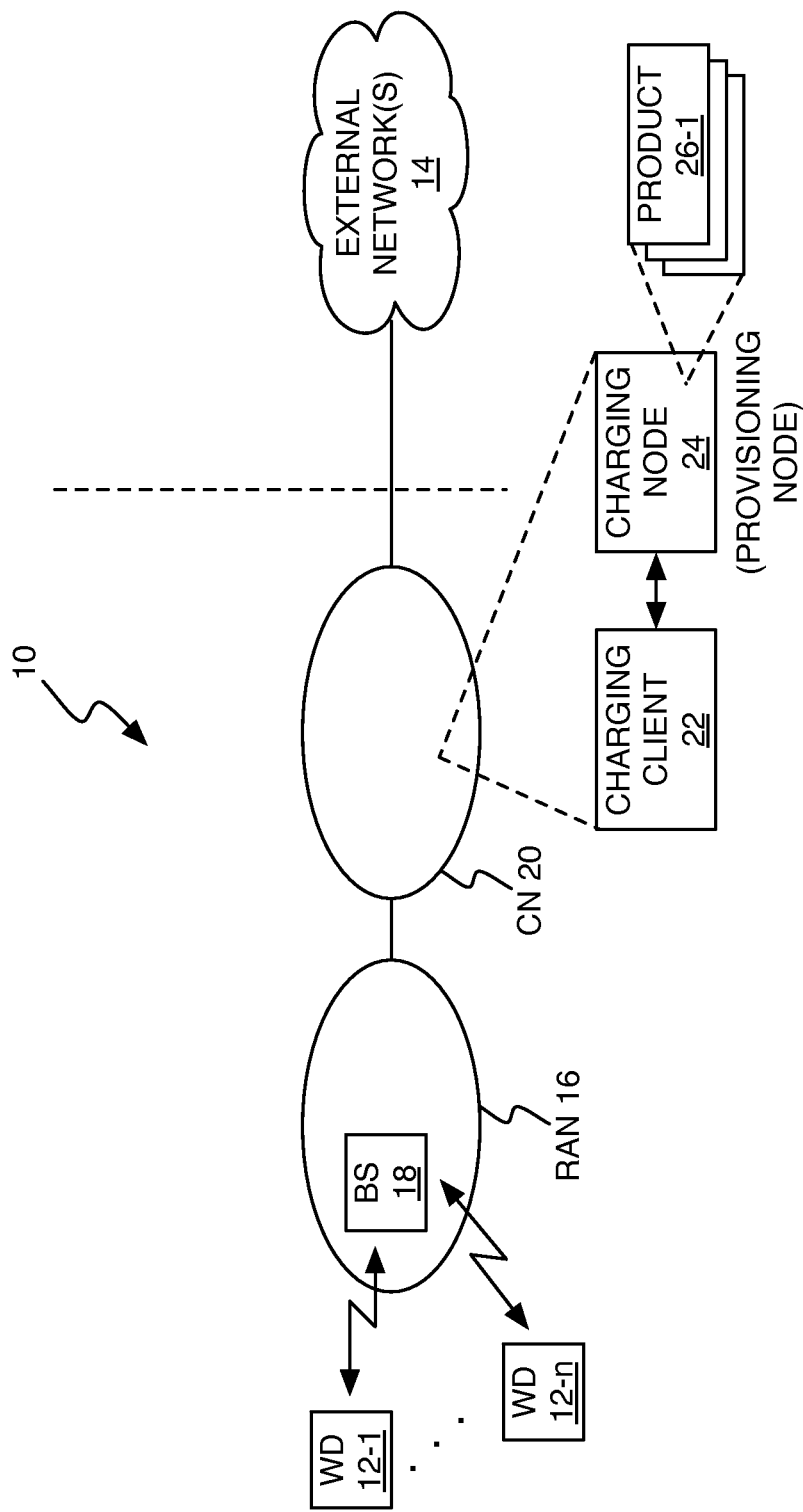
FIG. 1 is a block diagram of one embodiment of a communication network that includes a charging node configured for provisioning products for charging a product-related service in the communication network.

FIG. 1 is a block diagram of one embodiment of a communication network 10, referred to simply as the "network 10." By way of example, the network 10 is a cellular communication network, such as a Long Term Evolution, LTE, or Wideband CDMA, WCDMA, network, according to the specifications of the Third Generation Partnership Project, 3GPP.

The network 10 provides communication services to a number of subscribers, represented herein by their corresponding devices 12. In particular, devices 12-1 through 12-n are depicted, merely to indicate that there may be a potentially large plurality of such devices associated with the network 10, although only selected ones of them may be active at any given time. The devices 12 may be user equipments, or UEs in 3GPP parlance, and more broadly may be any type of mix of wireless or wired communication devices, such as cellular telephones, including smartphones and/or feature phones, tablets, computers, etc.

Indeed, while the network 10 in an example case is a cellular communication network 10 and the devices 12 represent wireless terminals, it will be appreciated that the teachings herein are not limited to wireless devices, and instead are directly applicable to other types of devices that may consume product-related services, including stationary wire-line devices, such as desktop computers, etc. Thus, unless otherwise noted, references to wireless devices will be understood merely as a non-limiting example for discussion purposes.

In an example, the network 10 provides mobile broadband connectivity to at least some of the devices 12, e.g., by connecting them with one or more external networks 14, such as the Internet or other packet data networks, PDNs. Of course, this is a non-limiting example, and the network 10 may provide other services, such as voice services, either additionally or alternatively.

The network 10 includes a Radio Access Network, RAN, 16, which includes a potentially large number of base stations 18, e.g., geographically distributed base stations providing coverage of over a potentially large geographic area. For simplicity, the diagram depicts only one base station 18, but there generally will be multiple base stations and other nodes, such as relays, positioning nodes, mobility-related entities, etc. Further, the RAN 16 may be a homogeneous network made up of like base stations 18, e.g., macro or large-area base stations, or the RAN 16 may be a heterogeneous network comprising a mix of macro and micro base stations 18, with hotspots or overlaid service provided by a number of pico cells.

The network 10 further includes a Core Network or CN 20, which here is greatly simplified. In an LTE embodiment, the CN 20 comprises an Evolved Packet Core or EPC, and includes various operational entities, including Mobility Management Entities or MMEs, packet gateways, a Home Subscriber Server, HSS, etc. These entities are not shown for the sake of simplicity and instead the diagram emphasizes the online/offline charging functions associated with the network 10, based on the depiction of a charging client 22 and a charging node 24. Together, these nodes form all or at least a portion of an overall "charging system" that is responsible for recording service usage by respective ones of the network subscribers, charging corresponding subscriber accounts, etc.

Of particular interest, the charging node 24 as taught herein performs an advantageous method of provisioning products 26, wherein the products needed to authorize use of a given product-related service by a given subscriber are generated on a service-triggered basis. Thus, while the diagram suggests that multiple products 26 are generated or otherwise stored in the charging node 24, e.g., product 26-1 and so on, the teachings herein advantageously avoid the need for pre-provisioning those products 26.

Figure 2:
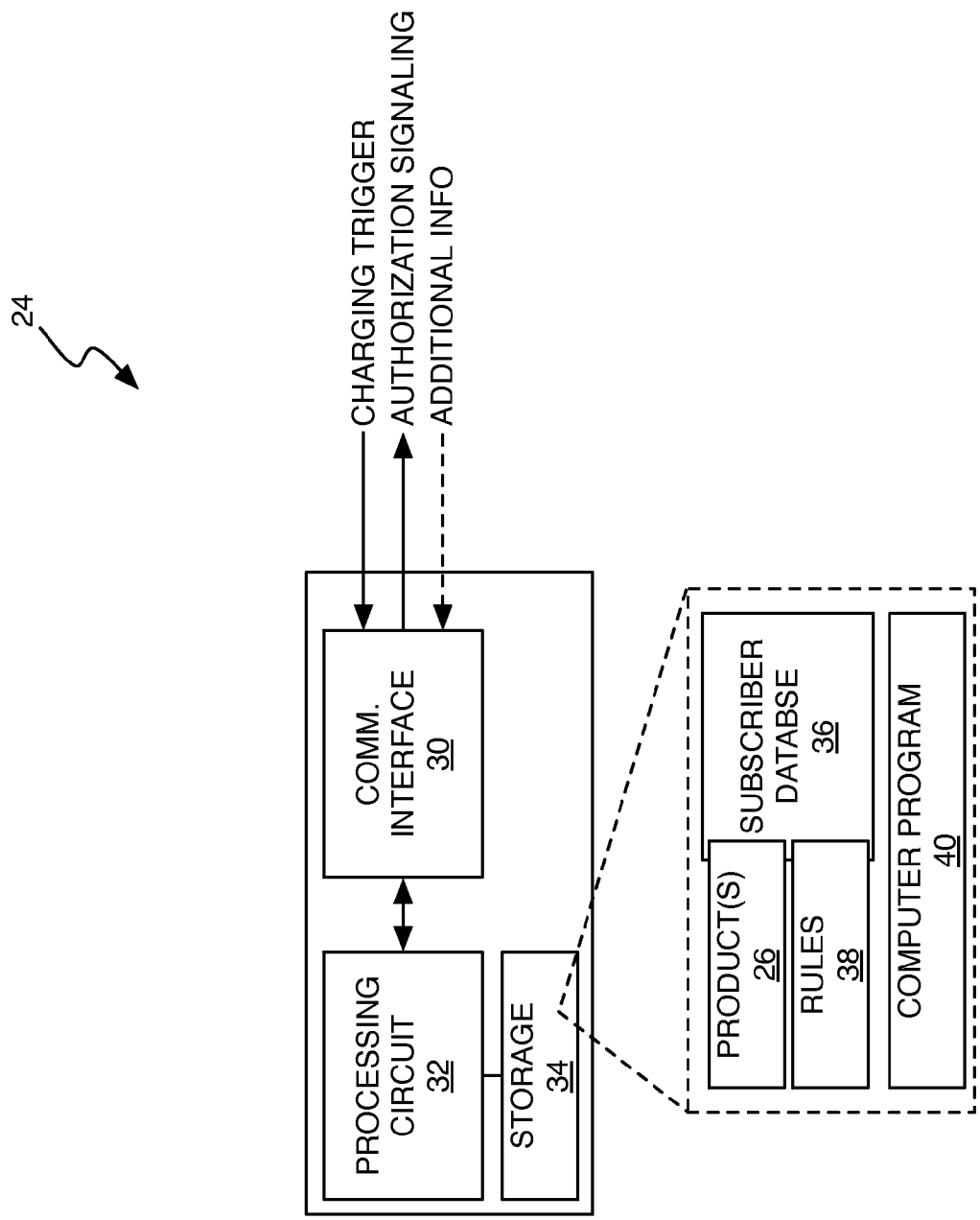
FIG. 2 is a block diagram of one embodiment of a charging node for product provisioning, as introduced in FIG. 1.

FIG. 2 depicts an example embodiment of the charging node 24, which is also referred to as a "network node 24" or simply as the "node 24." The node 24 includes a communication interface 30 and a processing circuit 32. The processing circuit 32 includes or has access to storage 34 that stores a subscriber database 36 that, at any given time, stores products 26 in any one of several states as defined herein. The storage 34 also stores one or more sets of product provisioning rules 38, for provisioning products 26 in accordance with any number of product offerings.

While the node 24 may be a separate, self-contained computer server, it also may be a distributed node that is functionally implemented across multiple computer systems within the CN 20. Likewise, the processing circuit 32 will be understood to comprise one or more microprocessor circuits or other digital processing circuitry. In some embodiments, the processing circuit 32 is specially adapted to perform the product provisioning operations taught herein, based on its execution of program instructions from a computer program 40 stored in the storage 34. In that regard, the storage 34 will be understood as comprising one or more types of computer-readable media configured for persistent, non-transitory storage of data and instructions, e.g., non-volatile memory and/or disk storage. Of course, the storage 34 further includes dynamic, working memory in some embodiments, such as for holding working copies of all or part of the subscriber database 36 or individual subscriber records therein.

With the above non-limiting example details in mind, the node 24 is configured to facilitate charging usage of a product-related service to a subscriber in the network 10. To support that functionality, the communication interface 30 is configured to receive a charging trigger arising from a service activity by the subscriber. In an example implementation, the communication interface 30 includes physical-layer interface circuitry and associated higher-layer protocol processing circuitry, supporting the exchange of charging-related messages.

Further, a "service activity" in this context means initiation of a product-related service by a given subscriber, such as the subscriber initiating a packet data connection to the network 10 with respect to metered broadband service, receiving or placing a voice call with respect to a prepaid or hourly service plan, etc. It will be understood that the subscriber uses a corresponding device 12, for example a wireless device, to initiate and engage in these activities.

The processing circuit 32 is operatively associated with the communication interface 30 and is configured to dynamically generate products for authorizing the product-related service, in response to the charging trigger. By performing dynamic generation responsive to the charging trigger, the processing circuit 32 advantageously eliminates or at least greatly reduces the need for pre-provisioning products for each subscriber that is eligible to use a product-related service.

In more detail, in an example embodiment, the processing circuit 32 is configured to authorize use of a product-related service by a subscriber with respect to one or more products 26, based on being configured to dynamically generate the one or more products 26 according to the defined set of product provisioning rules 38, or determine that the one or more products 26 are available from a prior generation. Here, any given product 26 "covers" a defined amount of service usage. For example, a broadband data service may be metered in hourly increments and/or in increments of 25 MBs of data transfer, and a corresponding product 26 covers up to 25 MB of data transfer.

Correspondingly, the processing circuit 32 is configured to assess any actual usage of the service by the subscriber against the one or more products 26, up to the defined amount of service usage covered by the one or more products 26, and to dynamically generate additional products 26 as needed, to cover continued actual use of the service by the subscriber. Here, the processing circuit 32 performs this dynamic, as-needed generation of additional products 26, based on being configured to prospectively generate each next additional product 26 before reaching a coverage limit of a current additional product 26 against which the continued actual usage is being assessed. Further, the processing circuit 32 is configured to save "used" ones of the products 26 in the subscriber database 36 and/or to generate corresponding Call Detail Records, CDRs, to record the actual usage of the service by the subscriber. Note that a subscriber may be an online-subscriber that is charged online, in real-time, or a subscriber may be an off-line subscriber that is charged offline, i.e., receives a bill later for services.

In some embodiments, the processing circuit 32 is configured to remove any products that were speculatively generated but not needed to cover actual use of the service by the subscriber. Such products 26 may be regarded as unused products 26. Discarding unused products 26 avoids the accumulation of speculatively provisioned products 26 in the subscriber database 36. That is, according to the above teachings, the processing circuit 32 will be understood as speculatively generating a limited number of products for a given subscriber, in response to receiving a charging trigger associated with the corresponding product-related service. In this regard, actual usage of the service by the subscriber may be imminent but there is not necessarily any guarantee that the speculatively generated product(s) 26 will be used immediately in conjunction with the trigger.

For example, the product-related service may be a voice service metered in one-hour blocks. Thus, in response to receiving a charging trigger arising from the subscriber attempting to place a call, the processing circuit 32 would generate a product 26 for the subscriber that covers one hour of voice service usage. However, if the called party does not answer, no actual service usage occurs. To handle this possibility, in one or more embodiments, speculatively generated products 26 are initially marked as unused and are generated to have a defined life cycle or expiry period. If a given product 26 remains unused upon reaching the end of its life, it is discarded.

That is, any product 26 for which no actual service usage has been assessed would be deleted upon expiry of its life cycle, providing an advantageous cleanup mechanism for avoiding the accumulation of speculatively generated products 26 in the subscriber database 36. Of course, to the extent that any quantum of actual service usage has been assessed against a given product 26, that product 26 is retained in the database 36 for the involved subscriber, for charging, usage tracking, etc.

Here, the processing circuit 32 may use the same data structure(s) for storing both fully-used and partially-used products 26, or may use different data structures for such storage. A fully used product 26 is a product 26 that is depleted—i.e., the full amount of service usage covered by the product 26 has been assessed against it. In contrast, a partially used product 26 is a product 26 which has some quantum of service usage assessed against it, but is not yet depleted—e.g., a one-hour product 26 has had 15 minutes of actual usage assessed against it and thus remains available for covering an additional 45 minutes of usage. Of course, there may a permissible time window in which such additional usage may be assessed and if no further usage is assessed within that window, the product 26 would not be considered as being available and would be treated like a depleted or fully used product 26.

In such embodiments, partially used products 26 are available for authorizing further service usage only to the extent that such usage occurs within the expiry times of the products 26. Ultimately, any product 26 that has had any quantum of service usage assessed against it is a used product, and used products 26 are retained in the corresponding subscriber record in the subscriber database 36.

Thus, in at least one embodiment, each given product 26 has a defined life cycle defining a period of time in which it must be used, and the processing circuit 32 is configured to discard any unused products 26 upon expiration of their corresponding life cycles. On the other hand, to the extent that any partially used products 26 belonging to a given subscriber are still valid for authorizing actual service usage, the processing circuit 32 may initially authorize a subsequent usage of the service by the subscriber using those partially used products 26, and then speculatively generate additional new products 26, to cover continued actual usage of the service by the subscriber.

However, consider the case where no products 26 are available from a prior generation for authorizing service usage for the subscriber, or where any such products 26 are insufficient to cover a usage quota associated with the charging trigger. In this case, the processing circuit 32 is configured to dynamically generate one or more products 26 initially, based on being configured to generate as many products 26 as are needed to cover the defined usage quota associated with the charging trigger.

Further, where actual service usage is ongoing, the processing circuit 32 is configured to prospectively generate each next additional product 26 before reaching the coverage limit of the current additional product 26 against which the continued actual usage is being assessed. In particular, in one or more embodiments, the processing circuit 32 in this context is configured to generate each next additional product 26 responsive to determining that a threshold usage amount has been assessed against the current additional product 26. For example, if the product offering defines products 26 that each cover one hour of service usage, the processing circuit 32 may speculatively generate a new product 26 to cover the next hour of service usage by the subscriber upon depleting ninety-percent of the product 26 against which usage is being assessed, thereby assuring an uninterrupted service for the user.

The processing circuit 32 is configured to leave the next additional product 26 in an unused state, unless the continued actual usage exceeds the coverage limit of the current additional product 26 and in which case the next additional product 26 is marked as being at least partially used. Note, too, that this next additional product 26 becomes the current additional product 26 for assessing ongoing actual use of the service, once such usage begins being assessed against it. Thus, in one or more embodiments, the processing circuit 32 is configured to deem any given product 26 to be unused initially upon its generation, and to subsequently deem the given product (26) as being at least partially used, in response to any quantum of actual use of the service by the subscriber being assessed against the given product 26.

Further, the processing circuit 32 is configured to dynamically generate additional products 26 as needed, based on being configured to generate the additional products 26 as needed, until the continued actual use stops, or until reaching a product generation limit for the subscriber. The processing circuit 32 may be configured to determine the product generation limit based on at least one of: subscriber information associated with the subscriber and service information associated with the service. Further, the product-related service in an example case is metered in one or more of the following terms: time intervals, data transfer amounts, and content sessions. Correspondingly, the product generation rules 38 would define the "amount" of service coverage offered by each product 26 in accordance with the unit(s) on which the product-related service is metered.

Figure 3:
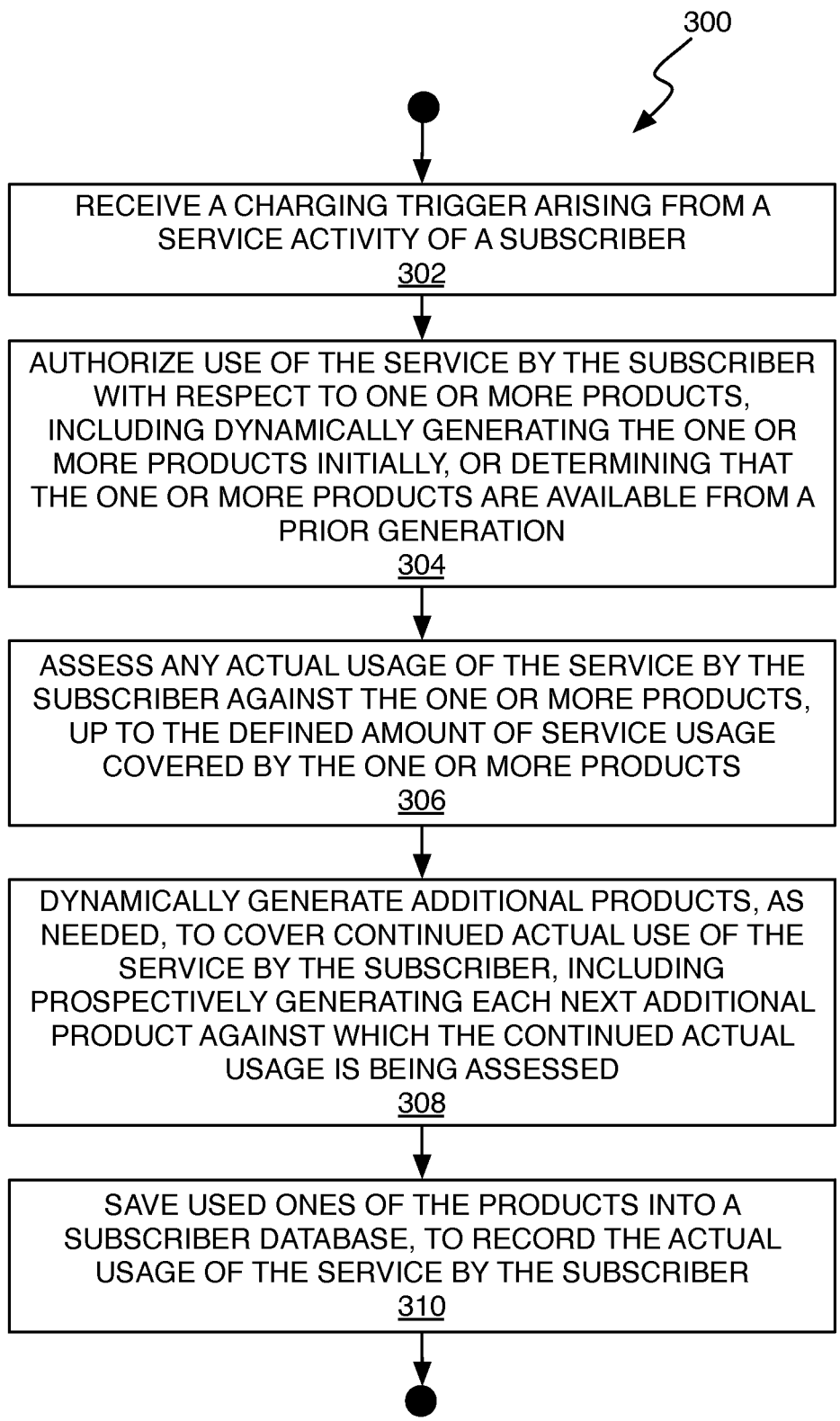
FIG. 3 is a logic flow diagram of one embodiment of a method for provisioning products for charging a product-related service.

FIG. 3 illustrates an example embodiment of a method 300 that corresponds to the above-described processing. The illustrated processing steps or operations may be performed in an order other than that suggested by the diagram. Further, certain operations may be performed in parallel or on a repeating, looped basis, and the method 300 may be performed in parallel, with respect to multiple subscribers and/or repeated as needed for a given subscriber. In at least one embodiment, the aforementioned computer program 40 comprises program instructions that, when executed by the processing circuit 32 of the node 24, configure the node 24 to carry out the method 300.

Broadly, the method 300 is directed to product provisioning for charging usage of a product-related service to a subscriber in a communication network, e.g., the network 10. The method 300 includes receiving (Block 302) a charging trigger arising from a service activity by the subscriber, and authorizing (Block 304) use of the service by the subscriber with respect to one or more products 26. This operation includes dynamically generating the one or more products 26 initially, according to a defined set of product provisioning rules 38, or determining that the one or more products 26 are available from a prior generation. Each given product 26 covers a defined amount of service usage.

The method 300 further includes assessing (Block 306) any actual usage of the service by the subscriber against the one or more products 26, up to the defined amount of service usage covered by the one or more products 26, and dynamically generating (Block 308) additional products 26 as needed, to cover continued actual use of the service by the subscriber. Dynamic generation in this regard includes prospectively generating each next additional product 26 before reaching a coverage limit of a current additional product 26 against which the continued actual usage is being assessed, and the method 300 further includes saving (Block 310) used ones of the products 26 into the subscriber database 36, to record the actual usage of the service by the subscriber.

Figure 4:
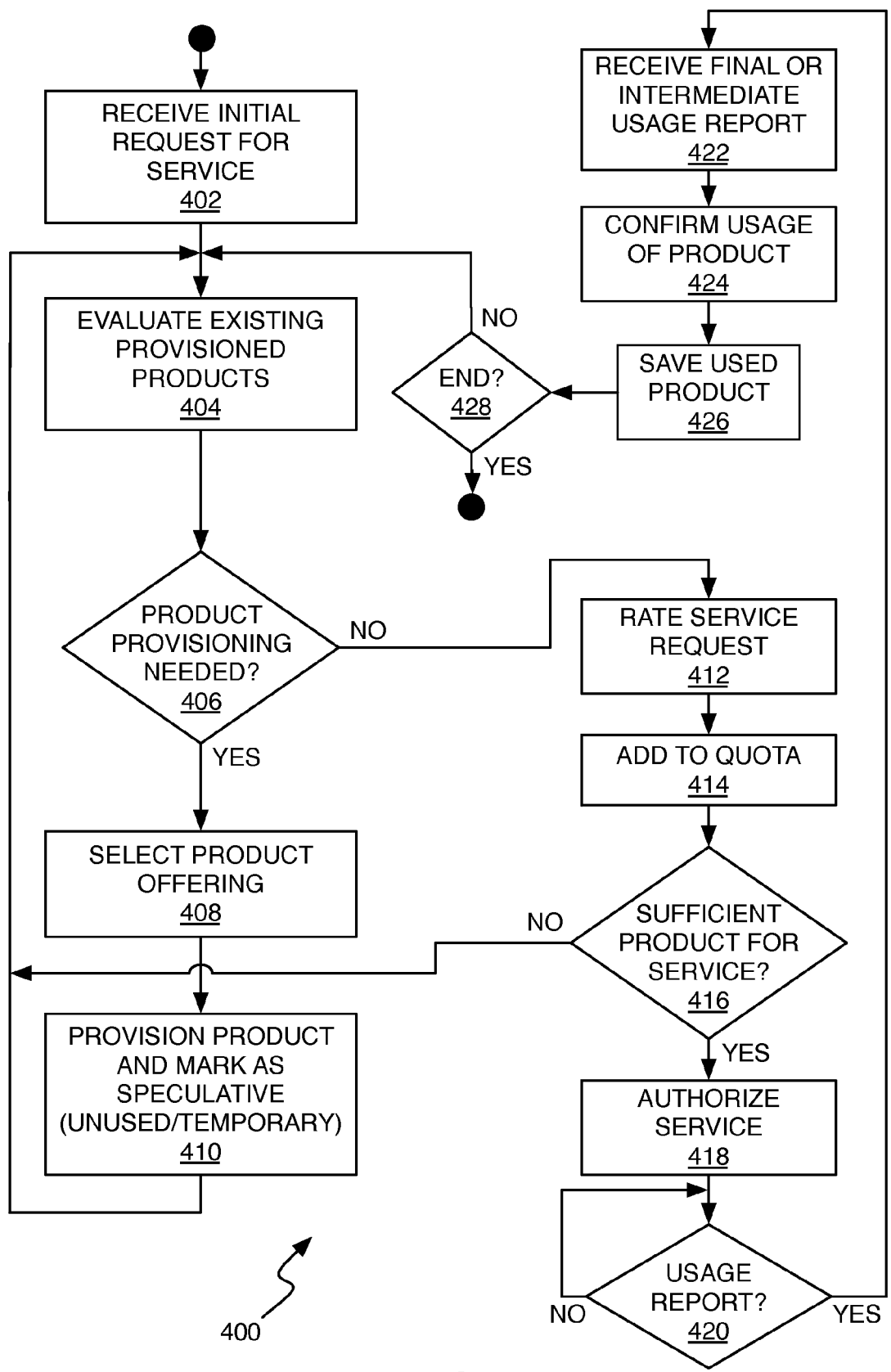
FIG. 4 is a logic flow diagram of further example details for the method introduced in FIG. 3.

FIG. 4 illustrates a method 400, which can be understood as a more detailed example embodiment of the method 300. The method 400 includes receiving (Block 402) an initial request for service—e.g., receiving a charging trigger from a charging client 22 arising from a given subscriber engaging in a service activity. The method 400 includes the node 24 evaluating (Block 404) existing provisioned products 26, to the extent that any exist for the involved subscriber. As noted, one or more products 26 may "exist" in the sense meant here inasmuch as a previously generated product 26 for the subscriber may not be fully depleted, while also being within any expiry period defined for its usage and not otherwise unavailable due to constraints tied to the usage of the product 26 at hand.

If there are no products 26 already provisioned for the subscriber (provisioning needed, YES from Block 406), processing continues with selecting (Block 408) the corresponding product offering, e.g., accessing the corresponding provisioning rules 38 that govern product generation for the involved service, and provisioning (Block 410) one or more products 26 in accordance with the provisioning rules 38. The newly generated product(s) 26 are marked or otherwise considered as being speculative, meaning that no actual usage has yet been assessed against them.

From there, processing returns to evaluating existing provisioned products 26 in Block 404, which now considers the newly generated product(s) 26, meaning that processing generally will at least initially flow from Block 406 (NO from Block 406) into Block 412. In other words, with at least one product 26 now provisioned for authorizing service use by the subscriber, a more detailed assessment is needed as to whether the existing product(s) 26 are sufficient for authorizing the service. That processing includes Block 412, in which the service request is rated.

The rating of the service request involves determining the value of the network resource usage for the service. Based on information, e.g. received in the initial request for service or retrieved from the subscriber database 36, the rating step returns the rating output in monetary or non-monetary units. Rating may handle a wide variety of ratable instances, such as rating of data volume, based on, for example, charging initiated by an access network entity and involving bearer level rating. In another example, such processing involves rating of session/connection time, e.g. based on charging initiated by a Session Initiated Protocol, SIP, application, where rating is performed on the subsystem level. Rating also may be based on service events, e.g. based on charging of web content or Multimedia Messaging Service, MMS, where rating is performed on the service level.

In any case, the value—in monetary or non-monetary units—is determined by the rating and is reserved from the subscriber's account and the corresponding amount of network resource usage—e.g. volume, time etc.—is added (Block 414) to the quota. The service coverage provided by the product(s) 26 is evaluated to determine whether it is sufficient to authorize the quota and, if not, processing returns to Blocks 404 and 406, where the YES path from Block 406 is executed at least one more time, to trigger the provisioning of one or more additional products 26.

Such processing is repeated the number of times needed to obtain enough products 26 to cover the quota, at which point processing continues along the YES path from Block 416, including authorizing (Block 418) the service and waiting (Block 420) on any subsequent intermediate or final usage reports. Here, it should be understood that "waiting" includes the continued performance of any supporting processing, including evaluating generated products 26 for expiry, etc. Thus, the waiting loop can be embodied in ongoing, overall processing, and in one or more embodiments, it includes assessing any subsequently reported actual usage of the service by the subscriber against the one or more speculatively generated products 26, at least within the valid life cycle of those products 26.

The waiting is at least implicitly bounded by the life cycle of the products 26 that were speculatively generated. Additionally, or alternatively, the authorized quota that is reported to the charging client 22 will have a lifetime associated with it. The charging client 22 in some embodiments uses this lifetime information as the basis for sending an intermediate interrogation asking for a new quota if the service is still ongoing, in response to charging client 22 determining that the currently authorized quota has expired.

Turning back to the diagram, assuming that usage reporting is received (YES from Block 420), processing includes receiving (Block 422) the usage report, which may be message or a pointer to a data structure that indicates the actual service usage by the subscriber, confirming (Block 424) the actual usage of the corresponding product 26 or products 26, whereby the value determined by the rating and reserved from the subscriber's account is deducted from the subscriber account, and saving (Block 426) used products 26 into the subscriber database 36 and/or generating a corresponding CDR. Thus, Step 424 confirms usage and deducts the amount (cost) that was determined as the cost for the reserved quota in step 412-414, from the account in the subscriber database, and data about the usage is "saved" in Step 426. For an online subscriber this "saving" is for accounting/tracking purpose as the cost was already deducted in step 424. For an offline subscriber, the saving provides a record used in subsequent billing.

Broadly, any used product 26 is saved—retained—in the subscriber database 36. However, a used product 26 that is not depleted may be saved or marked in such a way that it can be used to authorize further service usage by the subscriber, at least within the life cycle of the product 26 and only up to the coverage limit of the product 26.

The processing as described immediately above can be understood as evaluating the quota usage that was actually used by the subscriber. That is, in the authorization process the subscriber gets an amount of authorized quota that can be used for the service. The quota is typically available for a limited period of time, e.g., the authorized quota has a validity time associated with it. When either this validity time has elapsed or the authorized quota is consumed, the charging client 22 reports to the node 24 the amount of quota that was in fact used for the service. The used quota might be less than the granted/authorized amount. For Mobile Broadband Charging or MBC, there are numerous timers and rules that can trigger the charging client 22 to report used quota even though the quota is not depleted. The interested reader may refer to the 3GPP Technical Specification, TS, 32.299 for descriptions of example scenarios.

Turning back to the example processing flow, if the usage report was a final report, e.g., the subscriber terminated usage of the service—e.g., disconnected from a data session—then processing ends (YES from Block 428). Otherwise, if the usage report was an intermediate report and service usage continues, processing returns to Block 404 and onward (NO from Block 428), for dynamic provisioning of additional products 26, as needed. Multiple intermediate usage reports may be received for ongoing usage and the process may be repeated accordingly.

Figure 5:
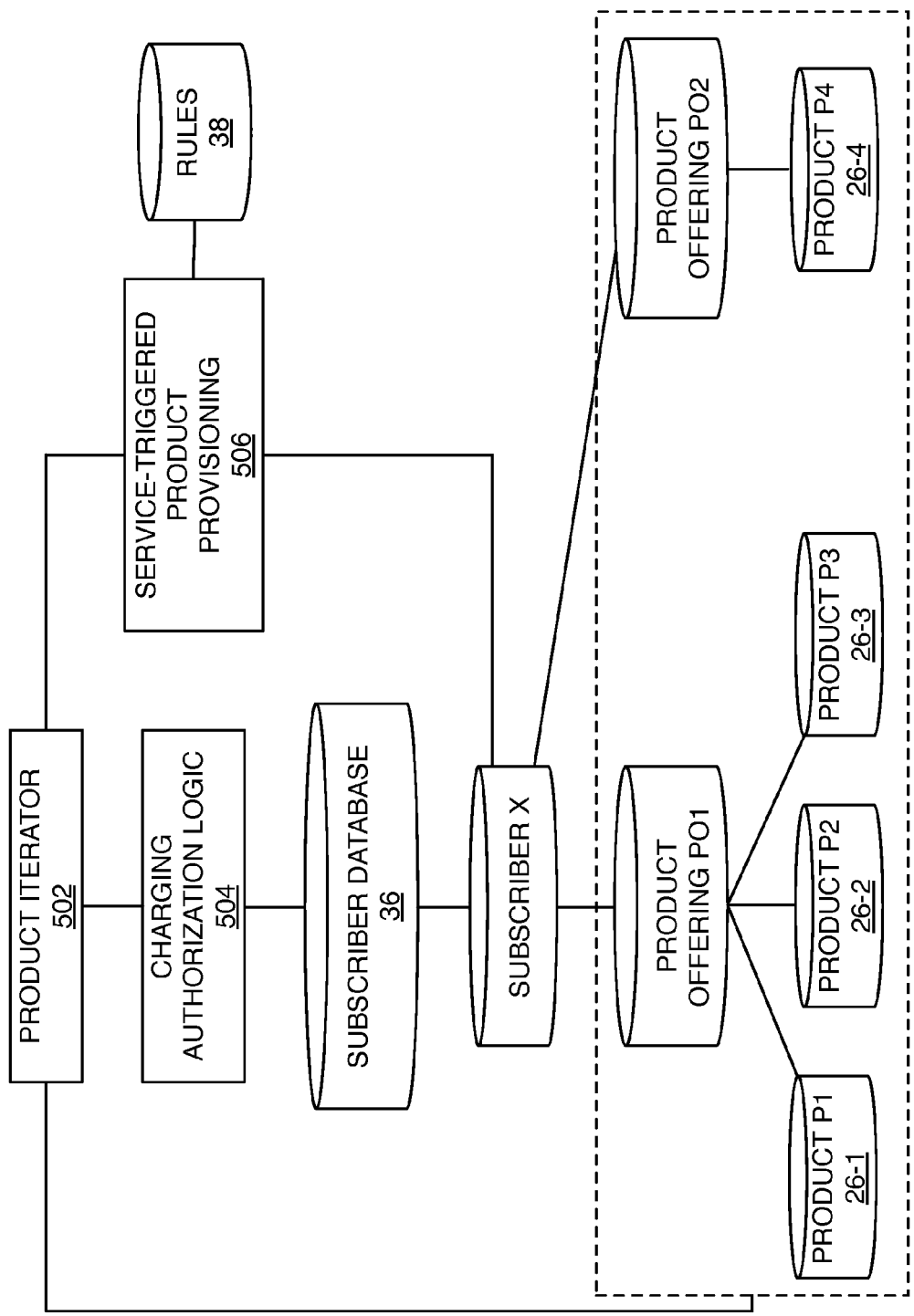
FIG. 5 is a block diagram of functional processing elements and related data items associated with service-triggered product provisioning in one embodiment taught herein.

Such processing can be represented functionally, as is done in the non-limiting example of FIG. 5, which depicts a product iterator function 502, a charging authorization logic function 504, and service-triggered product provisioning function 506. These functional processing circuits or processing units may be realized within the processing circuit 32 as fixed circuitry, programmed circuitry, or some combination of both. Further in the diagram, one sees that multiple products 26-1, 26-2, and 26-3 may be generated for a given subscriber, Subscriber X, with respect to a first product offering, PO1, and a further product 26-4 may be generated for Subscriber X with respect to a second product offering, PO2.

The product iterator is responsible for traversing a selected set of the subscriber's products. For example, based on the particular service that is involved, only Product Offering PO1 may be applicable. When performing charging authorization for the particular service, the charging authorization logic will use the rating and charging rules defined for PO1, together with the input from each product 26, as selected by the product iterator.

Such processing may be performed for any number of products 26 and product-related offerings, and with respect to any number of subscribers. Further, a given product 26 may be related to more than one service, meaning that that a given product 26 may be used to authorize any one of its related services. Broadly, when a service is evaluated in a charging authorization function, the evaluation triggers the provisioning of a product 26, or a set of products 26, for use in authorizing usage of the service by the subscriber. Each such product 26 covers a defined amount of service usage by that subscriber and, if used, it is saved for accounting, billing, and usage tracking.

In more detail, a newly generated product 26 is kept in memory, and when any actual usage is confirmed for that product 26, it is written to the subscriber database 36. In an example implementation, the complete product 26 is written to the database, and fields in the product data structure that relate to the actual usage—e.g., start time, end time, amount of usage—are filled with data at this stage. The same data, i.e. the full product 26, may also be written to the CDR as a receipt of the charged event for an online subscriber, or as the basis for billing production for an offline-charged subscriber.

When a product 26 goes from speculated mode, i.e., an unused state, to a confirmed mode, i.e., a used state, the product 26 is written to the subscriber database 36 and the change—i.e., the relevant usage information—is written to a CDR. Now consider the case where the used product 26 as written to the subscriber database 36 is only partially used and the product 26 remains valid for further usage assessment—i.e., it is still within its valid life cycle. When further actual usage of the product-related service by the involved subscriber, e.g., via an intermediate or final usage report received at the charging node 24, this further usage is assessed against the valid, partially-used product 26, e.g., by updating the relevant usage counters for the subscriber account, and corresponding data will also be stored in a generated CDR.

Products 26 are provisioned to the subscriber on as needed basis, e.g., product provisioning is triggered when the subscriber starts or continues to use a service, where the provisioned product(s) 26 enable the subscriber to use the service and ongoing usage is assessed against successive ones of the generated products 26. One or more new products 26 speculatively generated in advance of consuming the current product 26, at least in the case of ongoing, continuing service usage, or parallel service usage, by the subscriber, or with respect to the possibility of a subsequent usage of the service by the subscriber. However, in that latter case one or a very limited number of new products 26 would be speculatively generated. Provisioning in general is controlled by a set of defined product provisioning rules 38, and takes subscriber and service input information into account.

Thus, service-triggered product provisioning at taught herein is done in a speculative manner, meaning that each newly generated product 26 is temporary and generated based on the speculation that the subscriber will use it. The provisioned products 26 are considered as speculative until it can be determined if they are needed or not. If it is deemed that a product 26 was not needed in order to fulfill the requested service, the product 26 is removed from the subscriber database 36. Such automatic removal may be based on life cycle setting, e.g., expiry settings, and/or based on housekeeping routines run by the node 24.

Figure 6:
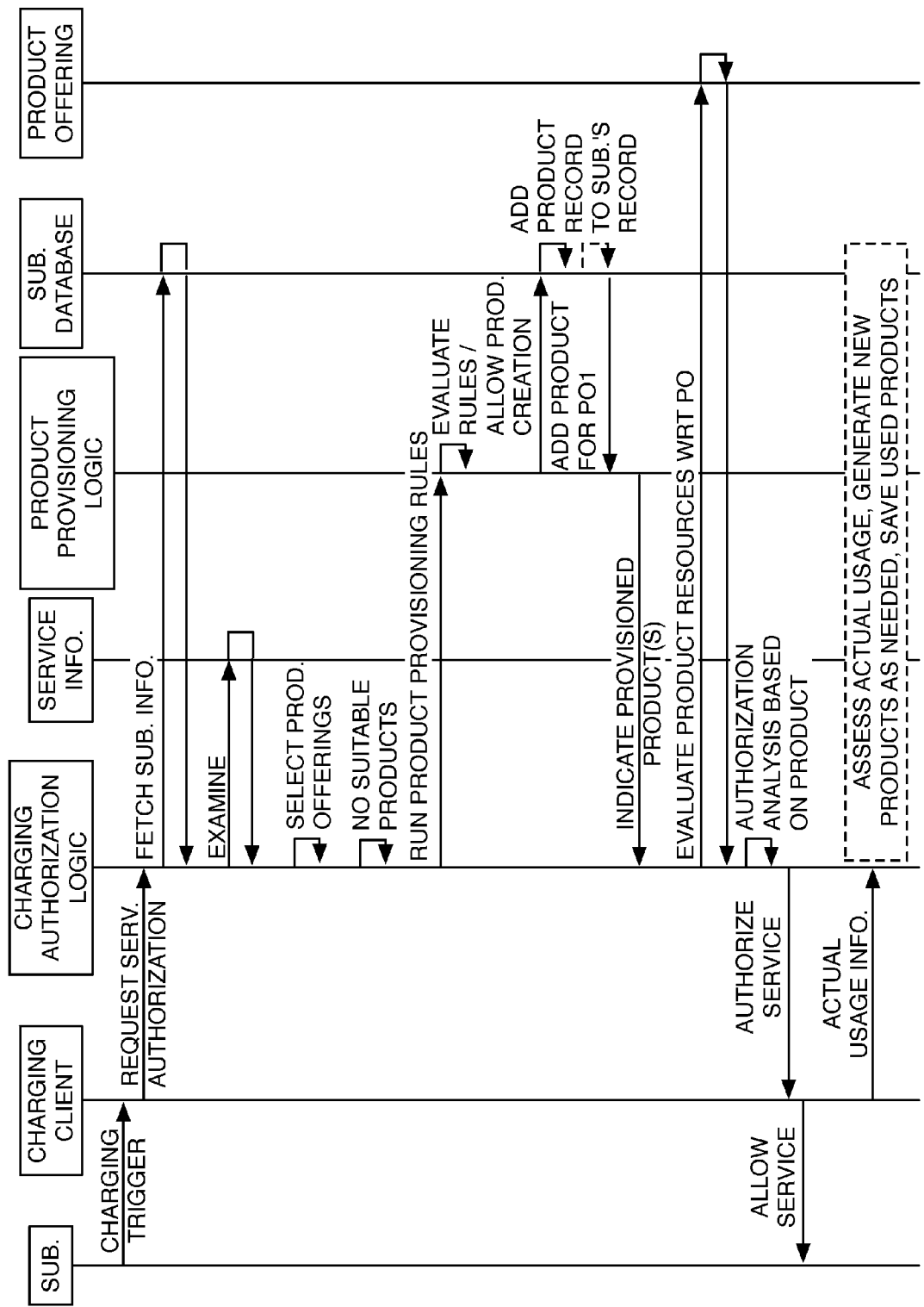
FIG. 6 is a signaling diagram of one embodiment of inter-node or inter-entity signaling associated with service-triggered product provisioning as taught herein.

Consider the example signal flow diagram presented as FIG. 6. Here, a subscriber, "SUB." in the diagram, performs a service activity that initiates a charging trigger that is received by the charging client 22. In turn, the charging client 22 sends a service authorization request to charging authorization logic, which can be understood as being embodied in the node 24. The charging authorization logic fetches subscriber information from the subscriber database 36, which it evaluates with respect to service-related parameters or settings. The evaluation is made, for example, based on the involved service and the settings for the particular subscriber, e.g. what subscription(s) the subscriber has. The charging authorization logic then selects the related product offering, determines that there are no suitable products 26 for initially authorizing the service, and therefore triggers exercise of the product provisioning rules 38 by product provisioning logic.

The above product selection mechanism is based on certain rules, e.g., governing which product offering has higher priority. According to such rules, a higher-priority product offering will be selected prior to a lower priority product offering. Product filtering rules also may be implemented, whereby certain product offerings are only applicable for certain services. For example, a "social media" product offering would only apply when the service for which authorization was requested is related to social media, such as where the subscriber is using or attempting to use FACEBOOK. Such service-to-product offerings may be predefined using a stored mapping.

The node 24 in one or more embodiments also implements the product provisioning logic, e.g., via the processing circuit 32, and the related illustrated signaling may be intra-node. However, the signaling between the charging authorization logic and the product provisioning logic is broken out here for clarity. The product provisioning logic evaluates the product provisioning rules 38 and allows product generation accordingly. In this example, the product provisioning logic generates one or more products 26 for a product offering PO1 and adds those products 26, at least temporarily, to the subscriber's records in the subscriber database 36. Such adding may entail linking the products 26 in their temporary state to the subscriber's account. Thus, while such products 26 are at least temporarily stored in the subscriber's database record, they are not "saved" in the sense that used products 26 are saved for billing, accounting, etc.

That is, "saving" is used in the context of accounting and historical recording. For example, if a subscriber is an "offline-charging user," saved products 26 and/or corresponding CDRs may be used for billing the subscriber via monthly billing. If the user is an "online-charging user," the actual charging corresponds to the confirming usage of the product 26 as suggested in Block 424 of FIG. 4. That is, once actual usage is assessed against a given product 26, the product is used and no longer "speculated" or temporary, and the cost that was previously determined by rating and reserved from the involved subscriber's account is actually deducted from the account.

Returning to the signal flow in the diagram, one sees that the product provisioning logic returns an indication of the provisioned products to the charging authorization logic, which evaluates the provisioned products 26 with respect to the product offering PO1, and authorizes use of the service by the subscriber according to that evaluation. In this regard, the product offering PO1 can be understood as an entity or data structure that contains product offering definitions and rules, and a corresponding product 26 is a corresponding instantiation of the product offering. Actual usage information reported back to the charging authorization logic and product provisioning logic is used to assess actual service usage against the provisioned products and to trigger additional product generation when needed.

Figure 7:
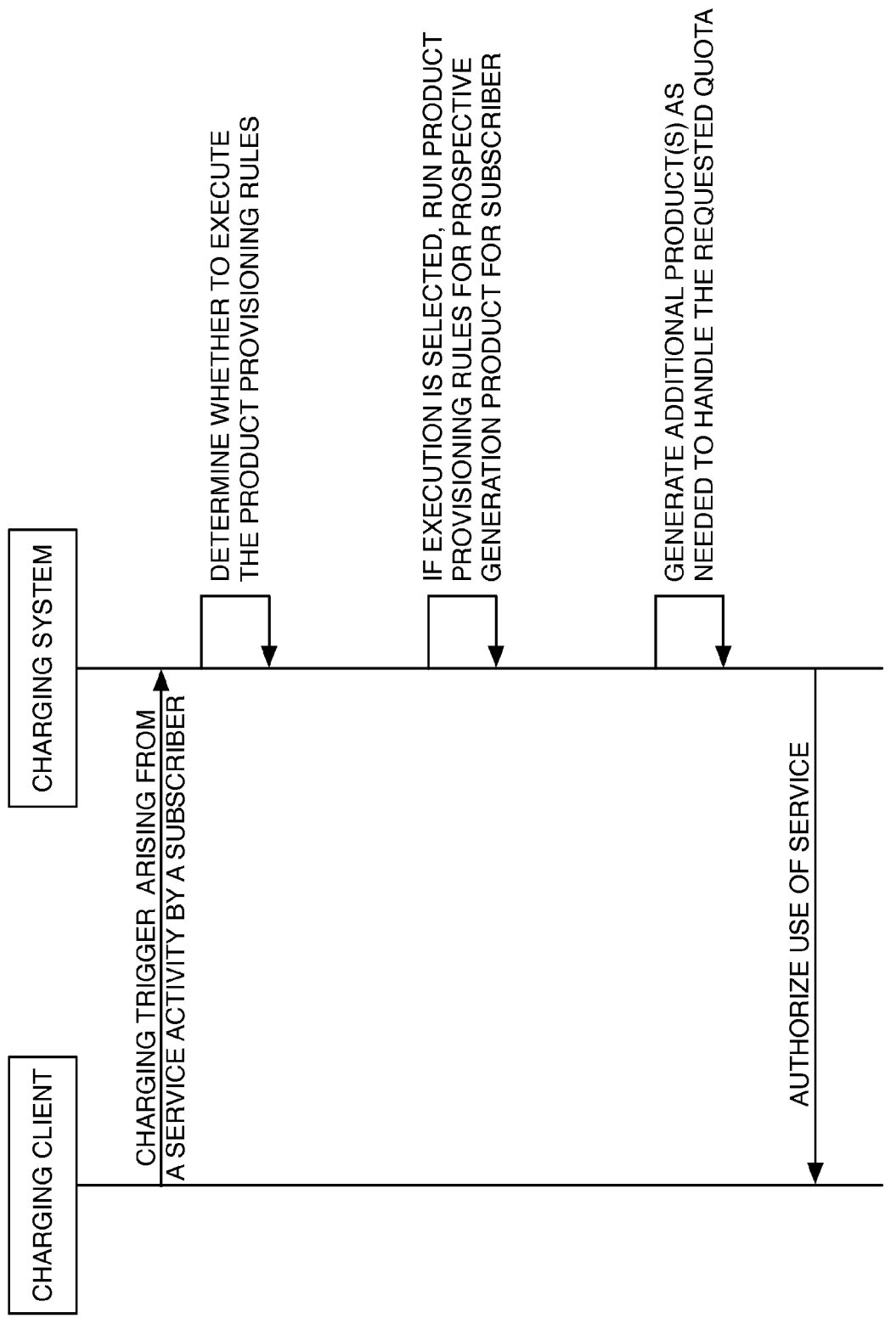
FIG. 7 is a signaling diagram associated with initial product provisioning according to an example embodiment.

FIG. 7 illustrates a simplified signaling flow related to the initial authorization and where the illustrated charging client and charging system can be understood in a non-limiting example to be the charging client 22 and charging node 24, respectively. A charging trigger arises from a service activity by a subscriber. An indication of that trigger is sent from the charging client to the charging system. In response, the charging system determines whether or not service-triggered product provisioning will be performed. The determination is made, for example, based on the involved service and the settings for the particular subscriber, e.g. what subscription(s) the subscriber has.

If execution of product provisioning is selected, the product provisioning rules 38 are followed for product provisioning. These operations include evaluating the requested quota and generating one or more products 26, as needed. As noted, to the extent that existing partially used product 26 is not already available and sufficient to cover the requested quota, product generation involves generating as many products 26 as are needed to authorize the requested quota. Of course, the processing logic includes robust exception handling, such for the case where the requested quota exceeds the number of products 26 that can be generated for the subscriber, e.g., because of limitations on the subscriber's account, or because of restrictions on the product offering. In any case, to the extent that it is permissible to generate the number of products 26 sufficient to handle the requested quota, use of the service by the subscriber is authorized, based on the generated products 26.

Figure 8:
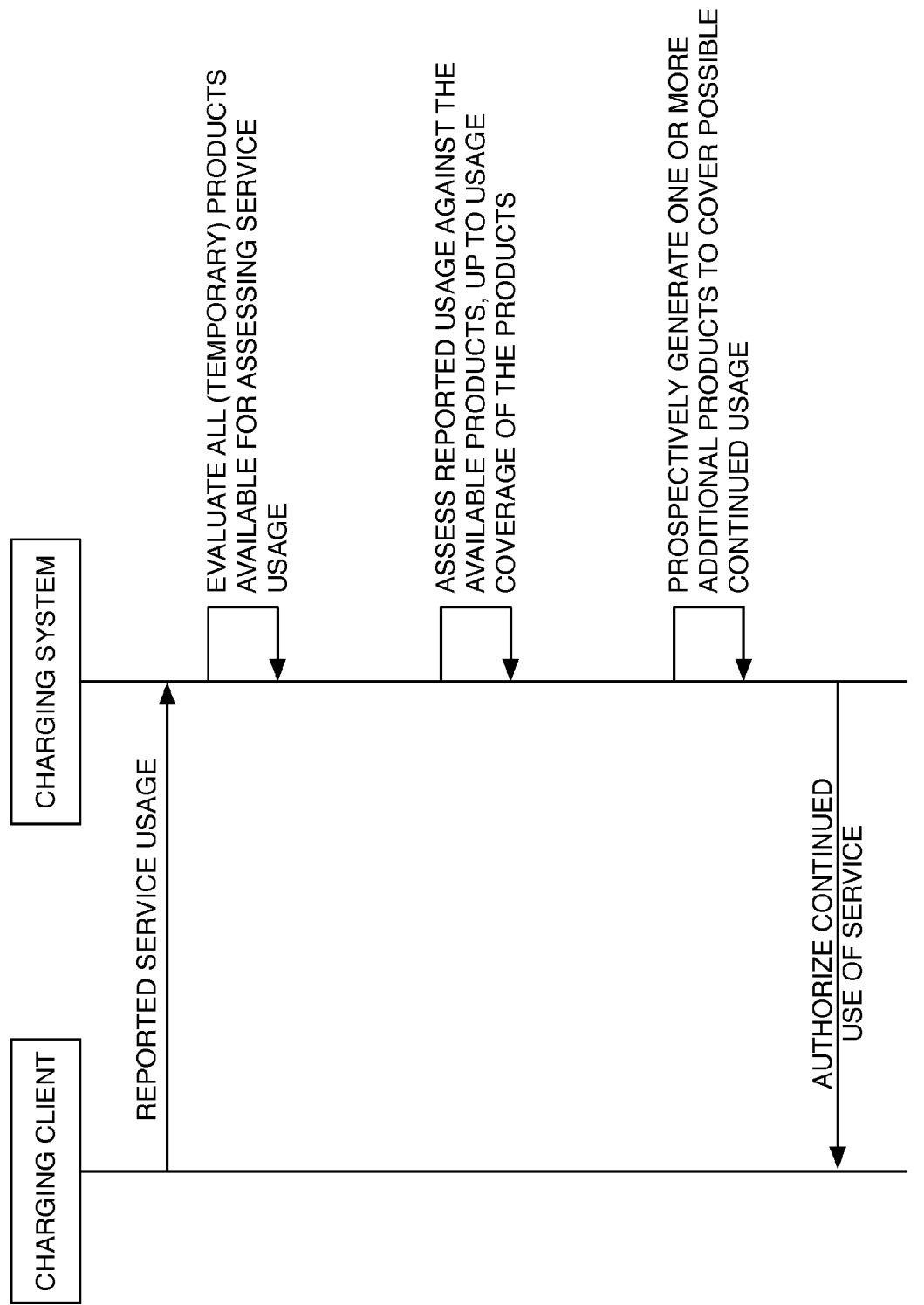
FIG. 8 is a signaling diagram associated with continuing product provisioning according to an example embodiment.

FIG. 8 is directed to processing associated with recording actual usage against an existing product 26 or products 26. The used quota for the service is reported from the charging client to the charging system. In turn, the charging system evaluates all available products 26 against which the service usage can be assessed. In an example case, the subscriber has an unused product against which no prior usage has been assessed and the reported usage is assessed against that product.

Thus, the reported usage is assessed against the available product(s) 26, up to the usage coverage of the product(s) 26, and the charging system may prospectively generate one or more additional products 26 to cover further usage of the service by the subscriber. The cost for the reported usage is rated and the usage is accumulated using the subscriber's available products 26.

As noted, once any quantum of actual service usage is assessed against an unused product 26, it is no longer temporary and it is marked or otherwise deemed as being used. Thus, any tagging or marking that is used denote temporary product subject to expiry or housecleaning removal is deleted from the product 26, so that it can be logged. For example, a call detail record is generated for each used product 26—here, used means fully or partially used. Further, if the subscriber is to continue using the service, e.g. it is some kind of streaming service; the charging system prospectively generates one or more additional products 26 to cover possible continued usage of the service.

By triggering product provisioning dynamically for authorizing service usage, new products 26 are provisioned to a given subscriber in order to fulfill a requested quota for the service to be used by the subscriber. If a new product 26 is provisioned, the rating logic will restart in order to include the new product 26 in the rating evaluation when granting the quota for the service. As noted, newly generated products 26 are initially in a temporary state. Generating products 26 to initially be in the temporary state accounts for the fact that the actual use of the service may or may not occur, depending on the nature of the product-related service, and the final consumed quota generally cannot be predicted. A data service is an example of such a service, where it is only speculated that the subscriber will consume a granted quota.

In case of parallel services being used by the subscriber, for example concurrent web service sessions, the temporary products 26 generated for the subscriber will be available for all services that are associated with the involved product offering. For example, for MBC, parallel services are typically services that are determined by the charging client 22 monitoring the subscriber data service usage using packet filters. These filters are connected to predefined service identifiers that are reported to the charging system when seeking service authorizations. Typically, there is a broad filter that catches general data traffic and then there are more fine-grained filters for detecting specific usages, e.g. FACE-BOOK, TWITTER, email, and so on. Each ongoing service creates a reference to a temporary product 26. As long as there are one or more services that are referencing the temporary product 26, it is considered to be in use and cannot be removed.

When the used quota is reported for the service, the subscriber's temporary products 26 are evaluated. If a temporary product was not needed—i.e., goes unused within its defined term of validity—it can be removed from the subscriber's records in the subscriber database 36. If a temporary product was used when rating the used quota for the service, the product is no longer considered to be temporary and the temporary state indicator is removed from the product 26, or it is otherwise deemed as being used and therefore is saved permanently for the subscriber in the subscriber database 36.

In that regard, the subscriber database 36 in one or more embodiments contains a record for each subscriber, which includes information on subscriptions, assigned product offerings, subscriber-owned resources, etc. is stored. Thus, each subscriber record, including any products 26 stored in that record, will consume physical memory.

Figure 9:
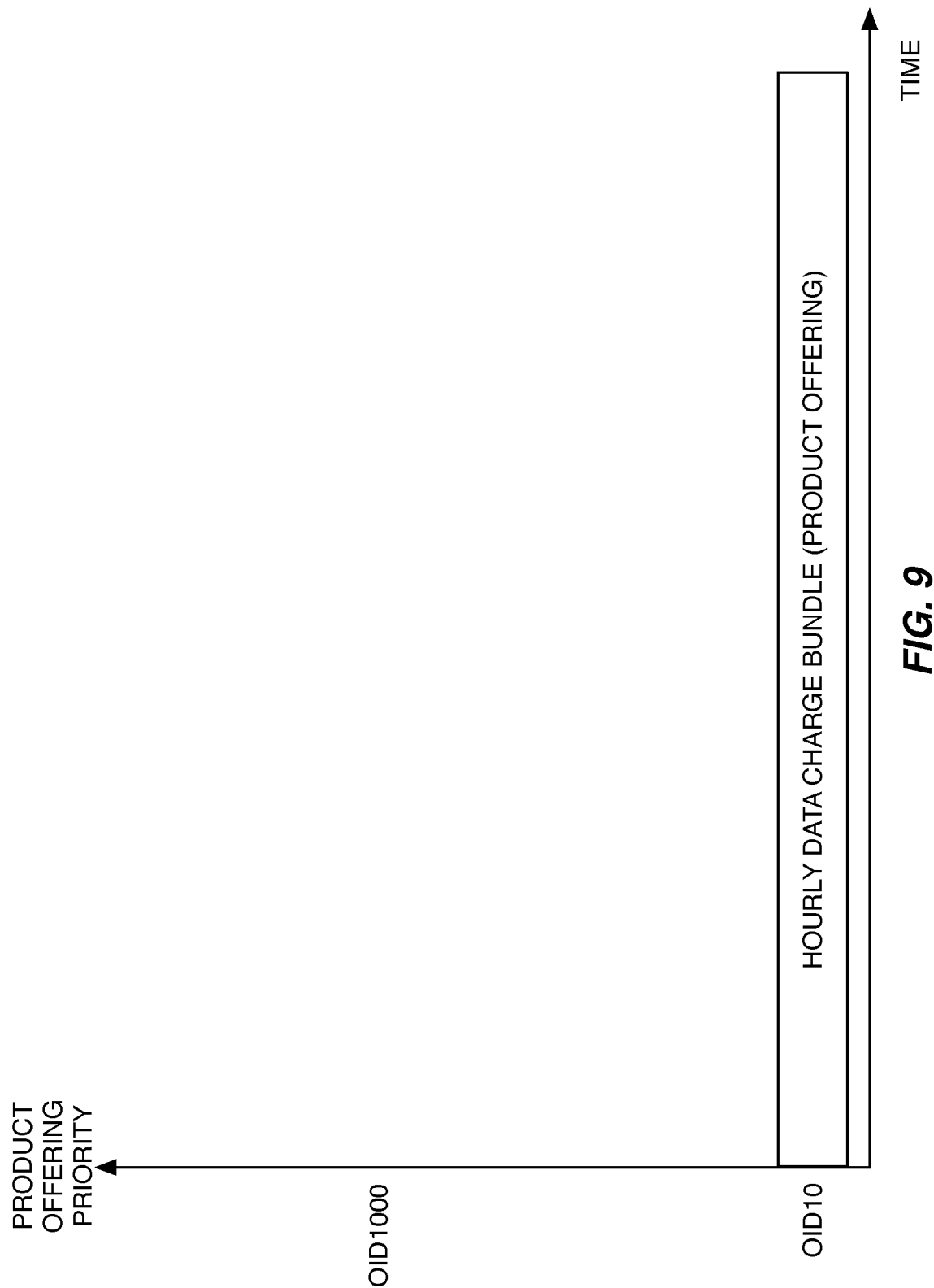
FIGS. 9-14 are diagrams illustrating example charging scenarios based on one or more embodiments of product provisioning as taught herein.

Now consider FIG. 9, which illustrates a use case where the product offering is an "Hourly Data Charge Bundle" according to which a subscriber must pay a fee for each started hour of service. The diagram illustrates this arrangement as the product offer "Hourly Data Charge Bundle" having therewith an associated offer identity, OID10, which is illustrated as having a priority level of 10 for the product offering. Here, "OID" stands for Offer Identification, meaning that product offers may have specific identifiers associated with them, and the relative priority of product offerings can be determined from the IDs. The OID may have a priority such as "10", "100" or "1000" associated with it. Thus, OID1000 will have a higher priority than OID100, etc. Products 26 are evaluated "top-down" meaning that products 26 having OID1000 will be selected before products having OID100 or OID10. The product offering also may impose limits on the amount of data the subscriber can transfer during each hour. Once the product fee is covered, the subscriber can use the service for one hour or until the usage limit is reached. If the subscriber continues to use the service when either the life cycle expires or the usage limit is reached, a fee for another hour will be deducted.

Thus, in the context of FIG. 9, the service-triggered provisioning taught herein would result in a temporary product 26 being generated for the subscriber responsive to a subscriber activity giving rise to a charging trigger for the hourly data service. Such a trigger would arise, for example, by the subscriber attempting to establish a data connection between the device 12 of the subscriber and the network 10. In response to that trigger, the charging node 24 would prospectively generate a product 26, where that product 26 is marked as temporary and covers one hour of data service and/or a defined amount of data transfer.

Authorization of the data service would be made based on that initially generated product 26, and to the extent that the subscriber actually uses the data service, such usage is assessed against the product 26. Once any quantum of actual usage is assessed against the product 26, it is no longer considered to be temporary and instead is considered to be used and it will be retained in the subscriber database 36 as part of the subscriber's record.

Figure 10:
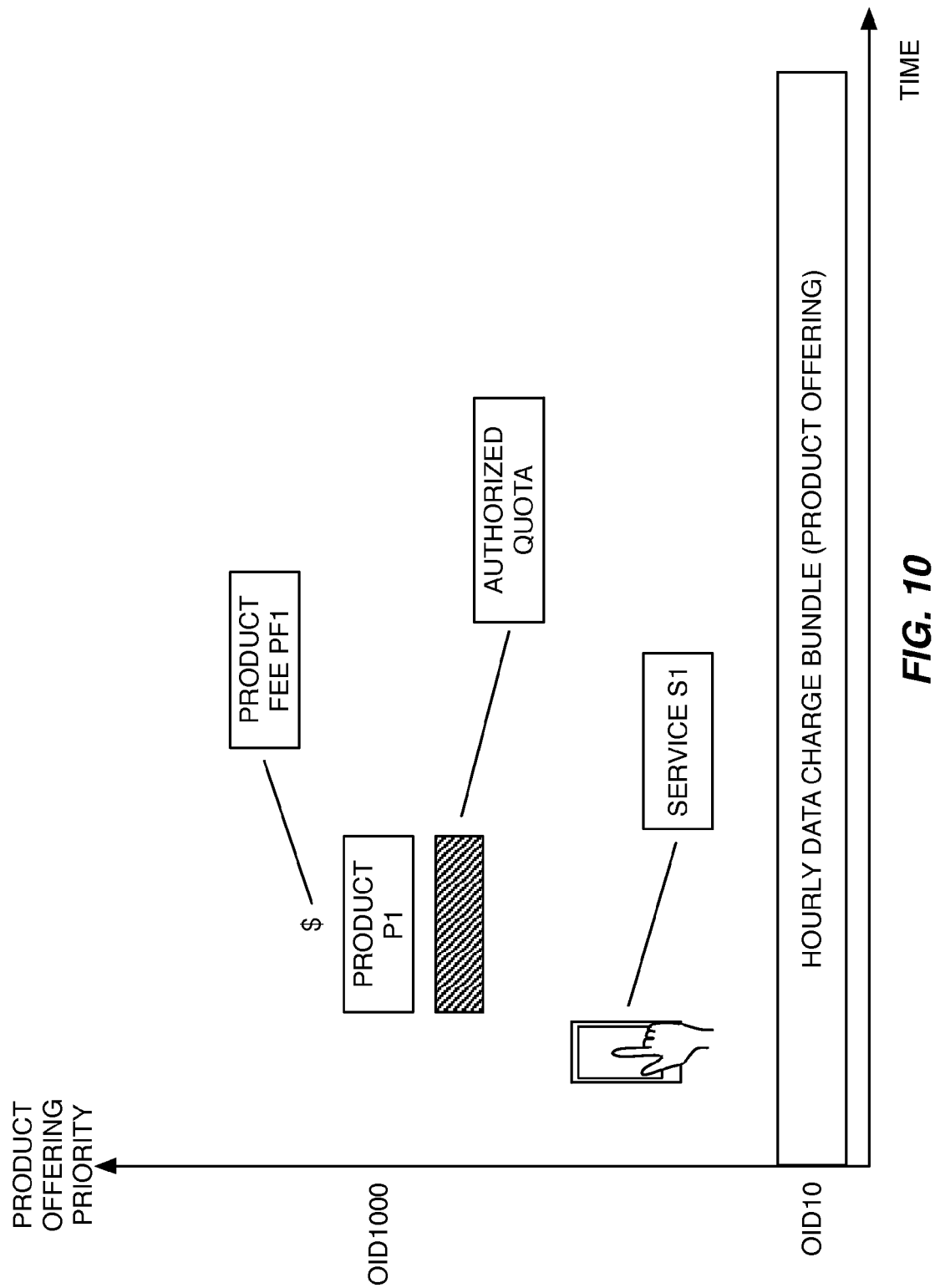

FIG. 10 continues the example of FIG. 9, but shows the subscriber initiating actual use of the hourly data service, denoted here as service S1. The product Offer OID10 is selected in the rating logic, which triggers the provisioning of a new product 26, denoted here as "P1", for offer ID 1000. The rating logic restarts its product evaluation as a consequence of the new product 26 being provisioned for the subscriber. Now product P1 will be selected in the rating logic and P1 will handle the requested quota for the service. A product fee PF1 is reserved for the product P1—i.e., granted or authorized. Of course, if the subscriber does not have sufficient funds for PF1, P1 will not be used by the rating logic.

Figure 11:
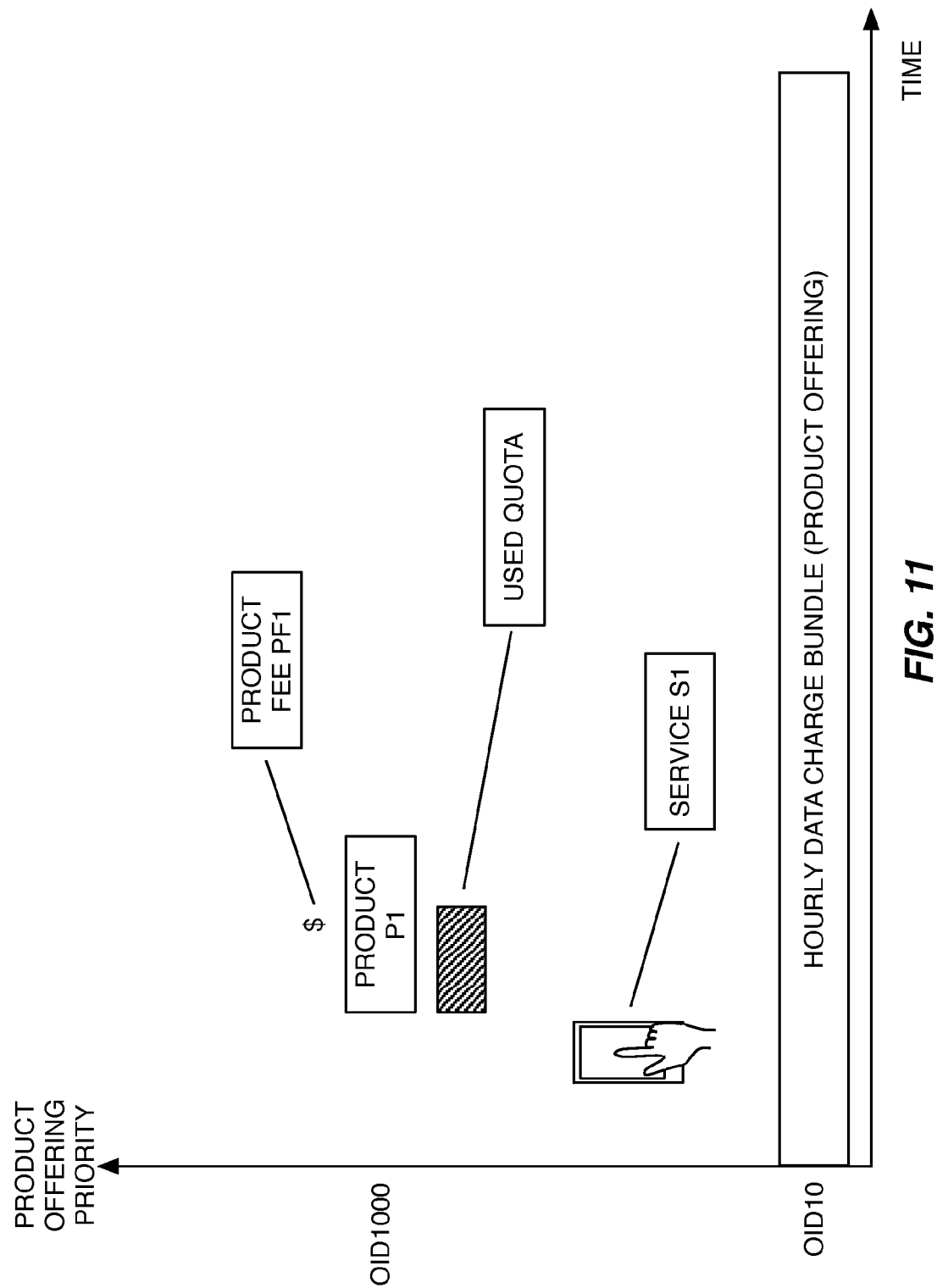

FIG. 11 continues the example in the context of actual usage being reported as assessed. Temporary product(s) 26 are committed to account for actual usage of the service. Thus, when usage by the subscriber is reported for the service S1, the product P1 is used when evaluating the service usage. That is, the actual usage—used quota—is assessed against the product P1 and the product P1 therefore is no longer considered to be temporary. The reserved product fee for product P1 is deducted, and a CDR is generated for P1, in order to log the fact that P1 has been committed to recording actual usage of the service by the subscriber.

Figure 12:
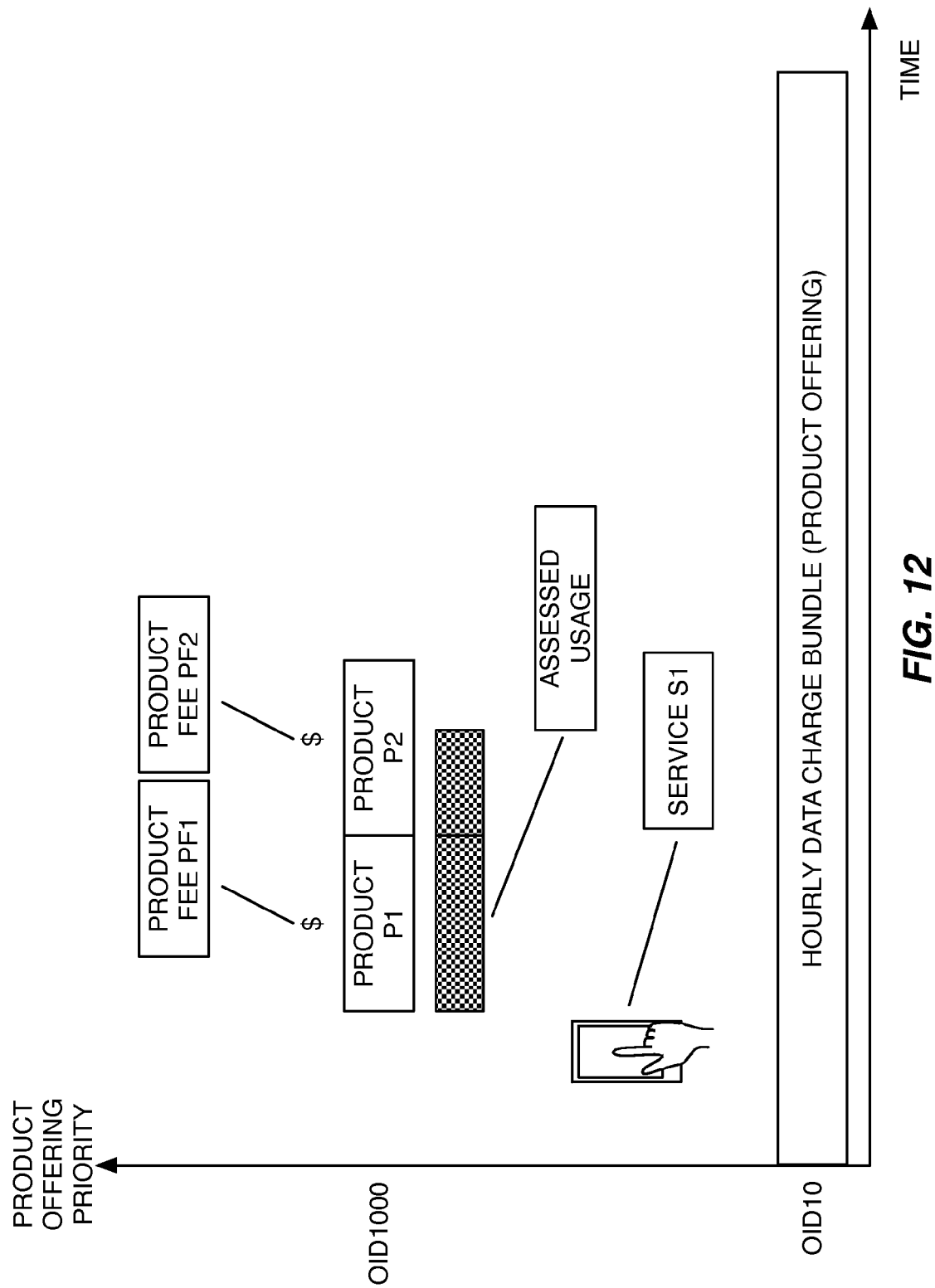

FIG. 12 is set in the same example context, but it illustrates the case where two temporary products 26, denoted here as product P1 and product P2, are provisioned in order to satisfy the requested quota. FIG. 12 can also be understood as an example where continued usage in the context of FIG. 11 triggers the provisioning of the second product P2.

However, consider the specific case where it takes more than one product 26 to satisfy the requested quota. Products 26 are provisioned until the entire requested quota is satisfied. Such generation can be handled iteratively, where each product 26 is generated, fulfillment of the quota is evaluated, and another product 26 is generated, and so on.

Thus, although one product P1 exists, this is not sufficient to fulfill the requested quota and therefor the evaluation of existing provisioned products continues in decreasing order of product priority. As no further products exists, the Product Offer OID10 will be reached and selected and the associated product provisioning rules 38 are executed and P1 is provisioned to the subscriber. Product P1 is selected in the rating process and a part of the requested quota is covered by the service resources represented by the product P1. However, because the resources of product P1 are insufficient to cover the full quota, the Product Offer OID10 is selected again, which triggers the provisioning of product P2. Product selection iteration is restarted and the rating process now selects product P2 for covering the remaining part of the quota. As products P1 and P2 cover the amount of usage represented by the requested quota, the requested quota is granted or otherwise authorized for the subscriber and a product fee is reserved for each of products P1 and P2.

Figure 13:
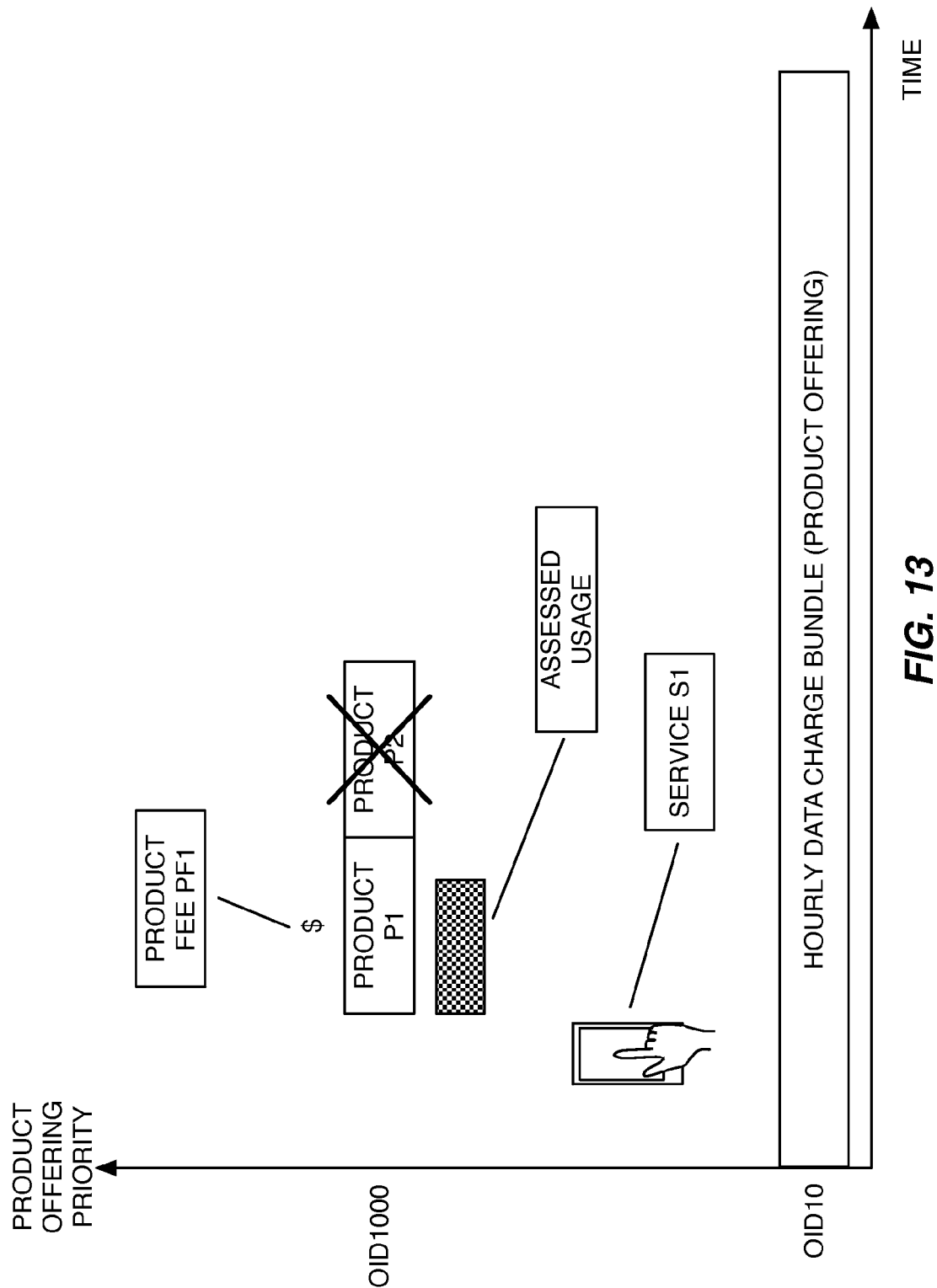

Actual usage of the service is first assessed against product P1, up to the amount covered by product P1. To the extent that actual usage exceeds the coverage of product P1, additional usage is assessed—recorded—against the coverage of product P2. Of course, additional products 26 beyond product P2 can be dynamically generated as needed. Further, to the extent that the actual usage does not exceed the coverage of product P1, then product P2 remains in the temporary state and can be deleted after any expiration period expires or as part of overall database housekeeping. In such a case, the fee for product P1 is deducted and the reserved fee for product P2 is cancelled. Such processing is illustrated in FIG. 13.

Figure 14:
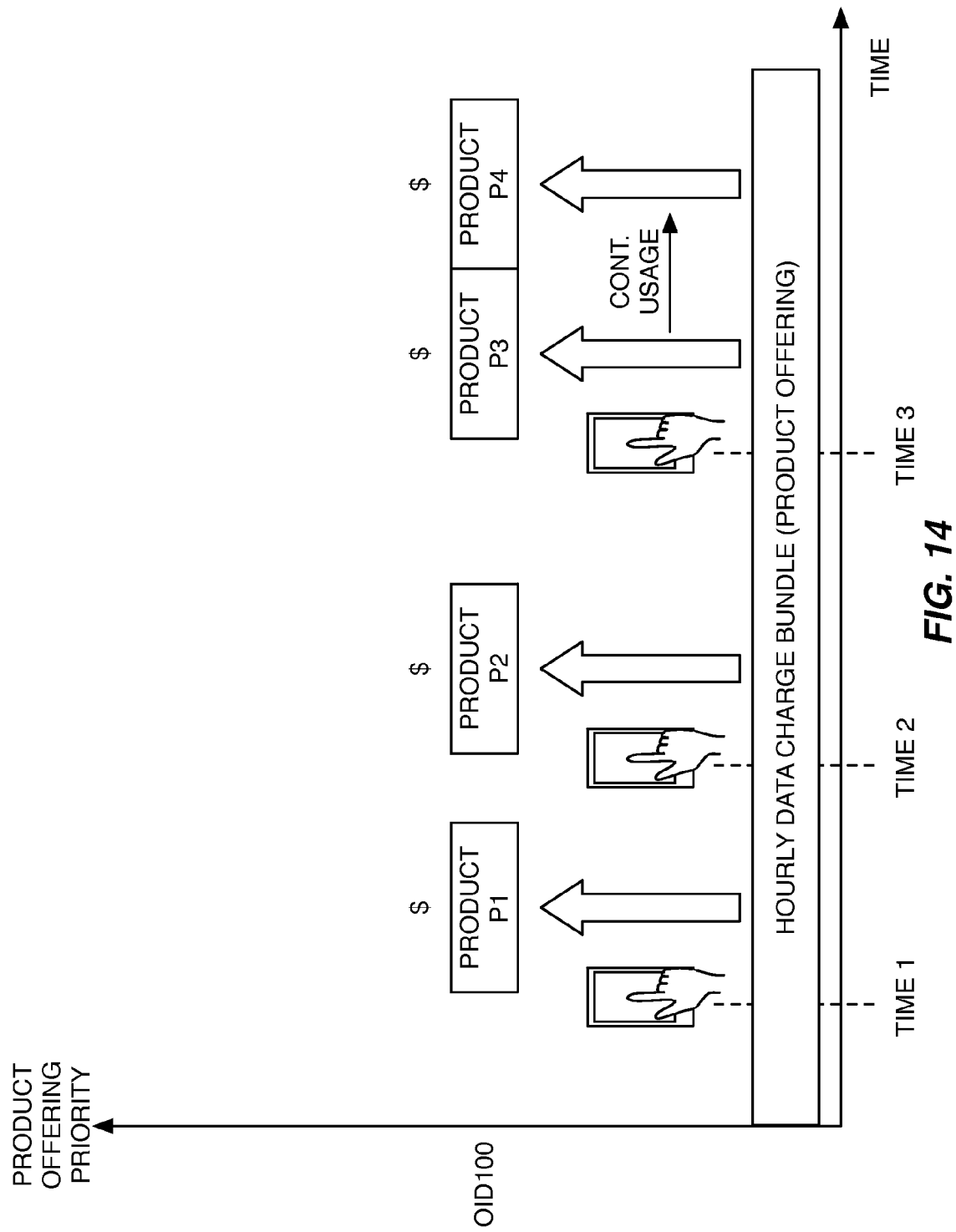

FIG. 14 illustrates a related example, where a subscriber initiates use of a service associated with a Product Offering ID 100. This service activity triggers the provisioning rules defined in offer ID 100, which results in provisioning a product P1 for the subscriber. The product P1 will be used for covering the requested quota for the reported service. The lifecycle for P1 is set to be one hour starting from the current time. The corresponding product fee is reserved for P1 with respect to the subscriber and later on deducted when the product P1 is considered to have been used. Here, the used condition could be based on fully depleting the resources covered by the product P1, or those resources being at least partly depleted upon expiry of the lifecycle of product P1.

The subscriber subsequently initiates further usage of the service, and a new product, P2, is created in the same manner as product P1. Assuming that the subscriber uses any quantum of the resources covered by the product P2, that product is saved for the subscriber and the corresponding product fee is deducted.

At some later time, the subscriber initiates further usage of the service and the product P3 is provisioned. However, here, the diagram illustrates the case where the actual service usage by the subscriber continues and results in provisioning of an additional product 26, denoted here as product P4. This dynamic, on-the-fly generation of products 26 as needed, results in seamless continued authorization of service usage and yet avoids the need to pre-provision products to cover the full eligibility of the subscriber to use the given service.

By eliminating the need to pre-provision products, e.g., products represent service bundles with recurring service charges, the teachings herein dramatically reduce the storage requirements imposed on the network operator's charging system. With the dynamic generation taught herein, even recurring bundle scenarios will only involve the dynamic generation of products 26 as needed to cover each recurring bundle. Further, by introducing temporary and used state markers or condition tracking, unused products can be automatically deleted rather than being allowed to continue consuming memory resources. Partially used products can be left available for assessing further service usage, at least within the valid lifecycle of such products, and any used product 26, whether partially or fully used, can be saved into the appropriate subscriber record within the subscriber database 36.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of product provisioning for charging usage of a product-related service to a subscriber in a communication network, said method comprising:
   receiving a charging trigger arising from a service activity by the subscriber;
   authorizing use of the service by the subscriber with respect to one or more products, including dynamically generating the one or more products initially, according to a defined set of product provisioning rules, or determining that the one or more products are available from a prior generation, wherein any given product covers a defined amount of service usage;
   assessing any actual usage of the service by the subscriber against the one or more products, up to the defined amount of service usage covered by the one or more products;
   dynamically generating additional products as needed, to cover continued actual use of the service by the subscriber, including prospectively generating each next additional product before reaching a coverage limit of a current additional product against which the continued actual usage is being assessed, wherein said prospectively generating each next additional product before reaching the coverage limit of the current additional product against which the continued actual usage is being assessed comprises generating each next additional product responsive to determining that a threshold usage amount has been assessed against the current additional product, and leaving the next additional product in an unused state, unless the continued actual usage exceeds the coverage limit of the current additional product and in which case the state of the next additional product is marked as used or partially-used in dependence on whether the continued actual usage depletes the next additional product; and
   saving used ones of the products into a subscriber database, to record the actual usage of the service by the subscriber.

2. The method of claim 1, further comprising removing any products that were generated but not needed to cover actual use of the service by the subscriber.

3. The method of claim 1, further comprising defining a life cycle for each product and discarding any unused products upon expiration of their corresponding life cycles.

4. The method of claim 1, wherein dynamically generating the one or more products initially comprises generating as many products as are needed to cover a defined usage quota associated with the charging trigger.

5. The method of claim 1, wherein any given product is deemed to be unused initially upon its generation, and is subsequently deemed to be at least partially used in response to any quantum of actual use of the service by the subscriber being assessed against the given product.

6. The method of claim 1, wherein dynamically generating additional products as needed, comprises generating additional products as needed until the continued actual use stops, or until reaching a product-generation limit for the subscriber.

7. The method of claim 6, further comprising determining the product-generation limit based on at least one of: subscriber information associated with the subscriber and service information associated with the service.

8. The method of claim 1, wherein the service is metered in one or more of the following terms: time intervals, data transfer amounts, and content sessions.

9. A network node configured to facilitate charging usage of a product-related service to a subscriber in a communication network, said network node comprising:
- a communication interface configured for receiving a charging trigger arising from a service activity by the subscriber;
- a processing circuit operatively associated with the communication interface and configured to:
  - authorize use of the service by the subscriber with respect to one or more products, based on being configured to dynamically generate the one or more products initially, according to a defined set of product provisioning rules, or determine that the one or more products are available from a prior generation, wherein any given product covers a defined amount of service usage;
  - assess any actual usage of the service by the subscriber against the one or more products, up to the defined amount of service usage covered by the one or more products;
  - dynamically generate additional products as needed, to cover continued actual use of the service by the subscriber, based on being configured to prospectively generate each next additional product before reaching a coverage limit of a current additional product against which the continued actual usage is being assessed, wherein the processing circuit is configured to prospectively generate each next additional product before reaching the coverage limit of the current additional product against which the continued actual usage is being assessed based on being configured to generate each next additional product responsive to determining that a threshold usage amount has been assessed against the current additional product and to leave the next additional product in an unused state for use in authorizing a subsequent activation of the service by the subscriber, unless the continued actual usage exceeds the coverage limit of the current additional product and in which case the next additional product is marked as used or partially used in dependence on whether the continued actual use depletes the next additional product; and
  - save used ones of the products into a subscriber database maintained in storage that is in or accessible to the network node, to record the actual usage of the service by the subscriber.

10. The network node of claim 9, wherein the processing circuit is configured to remove any products that were generated but not needed to cover actual use of the service by the subscriber.

11. The network node of claim 9, wherein each given product has a defined life cycle defining a period of time in which it must be used, and wherein the processing circuit is configured to discard any unused products upon expiration of their corresponding life cycles.

12. The network node of claim 9, wherein the processing circuit is configured to dynamically generate the one or more products initially, based on being configured to generate as many products as are needed to cover a defined usage quota associated with the charging trigger.

13. The network node of claim 9, wherein the processing circuit is configured to deem any given product to be unused initially upon its generation, and to subsequently deem the given product as being at least partially used, in response to any quantum of actual use of the service by the subscriber being assessed against the given product.

14. The network node of claim 9, wherein the processing circuit is configured to dynamically generate additional products as needed, based on being configured to generate the additional products as needed, until the continued actual use stops, or until reaching a product generation limit for the subscriber.

15. The network node of claim 14, wherein the processing circuit is configured to determine the product generation limit based on at least one of: subscriber information associated with the subscriber and service information associated with the service.

16. The network node of claim 9, wherein the service is metered in one or more of the following terms: time intervals, data transfer amounts, and content sessions.

* * * * *